(No Model.)

S. P. GRAHAM.
CUTTING TOOL AND HANDLE.

No. 433,078.  Patented July 29, 1890.

Witnesses
John Schuman.
Effie I. Croft.

Inventor
Simon P. Graham
By his Attorneys Parker W Burton

THE NORRIS PETERS CO., PHOTO-LITHO., WASHINGTON, D. C.

UNITED STATES PATENT OFFICE.

SIMON PETER GRAHAM, OF DETROIT, MICHIGAN.

CUTTING-TOOL AND HANDLE.

SPECIFICATION forming part of Letters Patent No. 433,078, dated July 29, 1890.

Application filed May 9, 1889. Serial No. 310,190. (No model.)

*To all whom it may concern:*

Be it known that I, SIMON PETER GRAHAM, a citizen of the United States, residing at Detroit, in the county of Wayne and State of Michigan, have invented a new and useful Improvement in Cutting-Tools and Handles, of which the following is a specification.

This invention relates to chisels or cutting-tools on which the cutting-edge is at one end of the tool and the handle is at the other end; and it has for its object the production of such a cutting-tool and the handle to be used with it. It also has for its object the production of a handle which may be used interchangeably with a number of cutting-blades.

Figure 6:
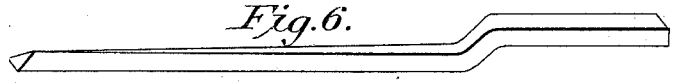
Figure 3:
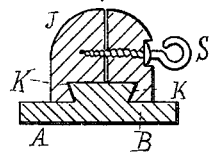
Figure 4:
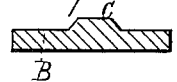
Figure 1:
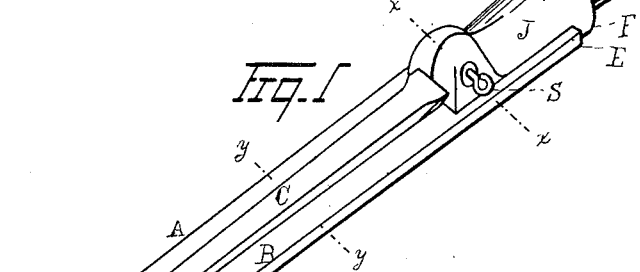
Figure 5:
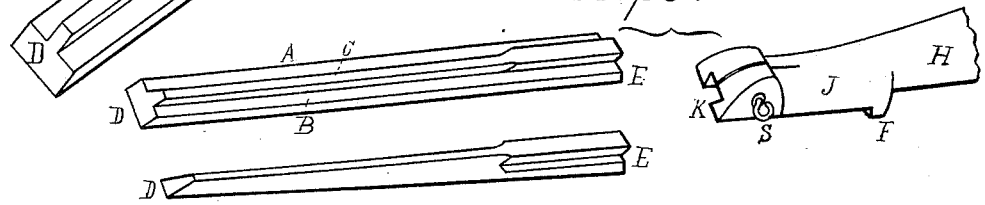
Figure 2:
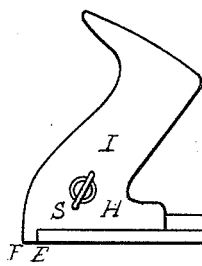

Figure 1 shows in perspective the combined blade of a cutting-tool and handle. Fig. 2 shows in side elevation a handle of different design from that shown in Fig. 1, but embodying the same invention. Fig. 3 shows a section across the blade and handle at the lines X X of Fig. 1. Fig. 4 shows a sectional view across the blade at the line Y Y. Fig. 5 shows a large and small sized blade and a handle adapted to receive either one of them. Fig. 6 shows a form of blade of narrow width where the blade is so narrow that the rib shown as extending along the line of the wider tools is undistinguishable from the rest of the blade.

A is the blade of the tool, of which the body B is rolled of thin steel. It has a rib C extending centrally along its entire length. The end D is ground to a cutting-edge in the usual form. The end E is cut square across, and at this end for a short distance the rib C is undercut, so as to form a dovetail tenon, that fits into a corresponding dovetail mortise in the handle H. The handle H is made, preferably, of metal, with a socket at one end, into which a wooden part I is driven, or is made entirely of metal when used in the form shown in Fig. 2 as a handle for paring-chisels. The end J of the handle H is flat on one side, and has a dovetail mortise K extending along the flat side. At the inner end of the flat side, across both it and the mortise, is a flange, which forms an abutment or stop to the rear end of the blade A. The end J of the handle H is split with a slit perpendicular to the flat side and central to the mortise K, and a drawing-screw S passes through one of the sides of the slitted handle and into the other. There is flexibility enough in the split portion of the handle to enable the sides of the mortise K to be drawn slightly toward one another and up very tightly against the sides of the interposed tenon on the back of the blade, and by means of the drawing-screw S, I am able to set the sides of the mortise K up tightly against the tenon, and thus prevent the blade from slipping out of place in the handle. At the same time the sides of the mortise are readily loosened from the blade, and the blade can be removed at any time.

The special shape of the handle is not material to my invention, as my invention is equally applicable, whether the main body of the handle be in line or nearly in line with the blade, as in Fig. 1, or whether it be placed at a considerable angle to the axis of the blade, as shown in Fig. 2, and it is thus adapted to be especially useful because it enables one to use the same blade either as a firmer-chisel, a mortise-chisel, or a paring-chisel, and one is also enabled to use a single handle with a number of different chisels having cutting-edges of different widths, the only requisite being that the dovetail part of the rib C shall fit the mortise K. The special form of the remainder of the rib C, except that part which is dovetailed, is immaterial; but I usually make it in the form shown in cross-section in Fig. 4, as that gives the tool a neat and finished appearance.

For very narrow blades it is unnecessary to continue the main portion B back of the dovetail part, as the main portion would be so narrow that it would not form a bearing-surface against the flat side of the handle, and in these narrow chisels there would be no distinct line of demarkation between the rib and the body of the chisel, and I sometimes roll the blade thin, so that there is practically no rib or no extra thickening, and it then takes the form shown in Fig. 6.

Having thus described my invention, what I claim as novel, and desire to have secured to me by Letters Patent, is—

1. The blade of a chisel having a central rib extending along its entire length and having said central rib undercut so as to form a dovetail cross-section, substantially as and for the purpose described.

2. In combination with the cutting-blade of a chisel, which has a central rib extending along it, said central rib being dovetailed at one end, a handle having a flat side and a dovetail mortise extending lengthwise of the flat side and adapted to receive the tenon upon the chisel, substantially as and for the purpose described.

3. A tool-handle arranged with a dovetail mortise to receive and hold a tool-blade having a central longitudinal rib, of which the cross-section is dovetailed in form, the said tool-handle having a vertical slit and a drawing-screw, by means of which the dovetailed sides of the mortise may be drawn against the sides of the tenon on the tool, substantially as and for the purpose described.

SIMON PETER GRAHAM.

Witnesses:
EFFIE I. CROFT,
CHARLES F. BURTON.